United States Patent
Simsic et al.

(10) Patent No.: US 6,717,989 B1
(45) Date of Patent: Apr. 6, 2004

(54) VIDEO DECODING APPARATUS AND METHOD FOR A SHARED DISPLAY MEMORY SYSTEM

(75) Inventors: Biljana D. Simsic, Sunnyvale, CA (US); Michael Frank, Newtown, PA (US)

(73) Assignee: ATI International Srl, Christ Church (BB)

( * ) Notice: Subject to any disclaimer, the term of this patent is extended or adjusted under 35 U.S.C. 154(b) by 0 days.

(21) Appl. No.: 09/433,101

(22) Filed: Nov. 3, 1999

(51) Int. Cl.[7] .................................. H04B 1/66
(52) U.S. Cl. ............ 375/240.26; 375/240; 375/240.25; 375/240.28; 382/232; 382/235; 348/425.1; 348/425.4
(58) Field of Search ................ 375/240.26, 240.25, 375/240, 240.28, 24.01; 382/232, 235; 348/425.1, 385, 425.4, 386, 387, 390, 394, 412, 415, 409

(56) References Cited

U.S. PATENT DOCUMENTS

| 5,467,459 A | * | 11/1995 | Alexander et al. | .......... | 711/153 |
| 5,559,999 A | * | 9/1996 | Maturi et al. | ................ | 713/400 |
| 5,583,650 A | * | 12/1996 | Lane et al. | .................... | 386/81 |
| 5,818,533 A | * | 10/1998 | Auld et al. | .................. | 348/412 |
| 5,838,380 A | * | 11/1998 | Sun et al. | .................... | 348/412 |
| 5,903,282 A | * | 5/1999 | Schoner et al. | ............. | 345/507 |
| 5,974,181 A | * | 10/1999 | Prieto | .......................... | 382/232 |
| 6,072,548 A | * | 6/2000 | Schoner et al. | ........ | 375/240.26 |

* cited by examiner

*Primary Examiner*—Shawn S. An
(74) *Attorney, Agent, or Firm*—Vedder, Price, Kaufman & Kammholz, P.C.

(57) ABSTRACT

The video decoding apparatus and method includes providing a storage pointer command over a bus for a video decoder, wherein the storage pointer command contains index data associated with compressed video data. The index data represents, for example, a buffer storage location in a buffer that stores both decoded video being displayed and simultaneously uses another portion of the same buffer for decoding, such that the index data represents the storage location where corresponding decoded data is finally stored before display. The index data is compared with a current index or pointer associated with a current display line of a display engine. The apparatus and method includes stalling storage of compressed or uncompressed video data based on the comparison.

17 Claims, 5 Drawing Sheets

VIDEO DECODING APPARATUS AND METHOD FOR A SHARED DISPLAY MEMORY SYSTEM

FIELD OF THE INVENTION

The invention relates generally to video decoding systems and methods and more particularly to video decoding apparatus methods for systems that split decoding between at least two processing units and use commands to synchronize between those units.

BACKGROUND OF THE INVENTION

Video decoders, such as MPEG video decoders and other decoders, decode incoming compressed streams of video. Depending upon the type of video encoding, a video decoder may have associated with it a forward reference buffer, a backward reference buffer, a decoding buffer and a display buffer. A display engine displays data that is stored in the frame buffer so separate buffers are used for storing partially decoded data and filly decoded data in different buffers. For high resolution TV formats (HDTV 1920×1080) the required buffers may amount to approximately 12 megabytes (4×1920×1080×1.5 bytes). Using four different buffers can result in the unnecessary use of large amounts of costly memory.

For example, video decoders are known which include a software module typically executed by a host processor, that provides a sequence of commands to a hardware part of video decoder that includes a command to have a video decoder wait for an event to occur, such as the end of a frame scan to occur so that writing can commence to a particular buffer. The command stream, as known in the art, provides commands to a video decoding process which may decode video using a hardware decoder that may provide variable length decoding, inverse quantization, inverse discrete cosine transform (IDCT), motion compensation, or other suitable decoding operations. A command FIFO in front of the video decoder receives the command stream from the host processor. The decoding process in the video decoder typically uses four buffers. A forward reference buffer, a backward reference buffer, a decoding buffer, which may contain partially decoded information, and a display buffer which contains finally decoded video for display such as for overlay displays or other displays. For example, decoding commands in a command FIFO may be stalled until an entire frame has been displayed. For example, when the display engine has read and displayed the end of a frame or field from the display buffer. However, the use of the four buffers results in large amounts of costly memory in a graphics controller chip or other integrated circuits.

To reduce the amount of required memory, other conventional video decoders may share frame buffer addresses on a macro block, or row of macro blocks basis. For example, a hardware decoder may share the decoding buffer and display buffer to reduce memory size. In such systems, the hardware decoder receives data over a host bus, whereafter the hardware decoder provides a stall signal to a decoding block. This stall signal is based on the comparison of the current address that contains fully decoded information for display during this frame scan with the storage address for new data that will be displayed during a later frame scan, so that the hardware decoder can delay decoding information into the same buffer. Such systems can require large integrated circuitry which results in higher fabrication costs and lower process yields. Such decoders effectively generate their own commands and operating signals to determine buffer locations, and typically do not receive stall commands from a host processor. Such systems that share a frame buffer for both decoding and displaying, use three buffers instead of four buffers, but the larger amounts of hardware required can additionally increase the cost of the video processing portion.

Accordingly, there exists a need for an improved video decoding apparatus and method that uses a shared frame buffer memory for both decoding and displaying.

BRIEF DESCRIPTION OF THE DRAWINGS

The invention will be more readily understood with reference to the following drawings wherein.

DETAILED DESCRIPTION OF A PREFERRED EMBODIMENT OF THE INVENTION

Briefly, a video decoding apparatus and method provides a storage pointer command over a bus for a video decoder. The storage pointer command contains index data associated with compressed video data. The index data represents, for example, a buffer storage location or line addresses in a buffer that stores both decoded video for display, and simultaneously uses another portion of the same buffer to store video data that requires additional decoding. The index data represents storage locations where data is stored before display. The index data is compared with a current index or pointer associated with a current display line of a display engine. The apparatus and method includes stalling the decoding of video data including for example the storage of compressed video data, into the shared buffer space, based on the comparison of the index data with the current index.

In one embodiment, the apparatus and method includes stalling outputs of commands from a command FIFO to wait for a specified line number or row of macroblocks to be retrieved for display from a shared display memory and decoding memory buffer, prior to executing a command for storing partially or fully decoded data in the shared memory. The storage pointer command, in one embodiment, includes index data, such as a pointer to a last row of macroblocks in a group of rows of macroblocks to be stored in a frame buffer. The index data serves as a decoded data storage index pointing to the address of the last line of a group of lines that have been decoded for storage as display information. The index data is sent with associated partially compressed data as part of the storage pointer command.

Figure 1:
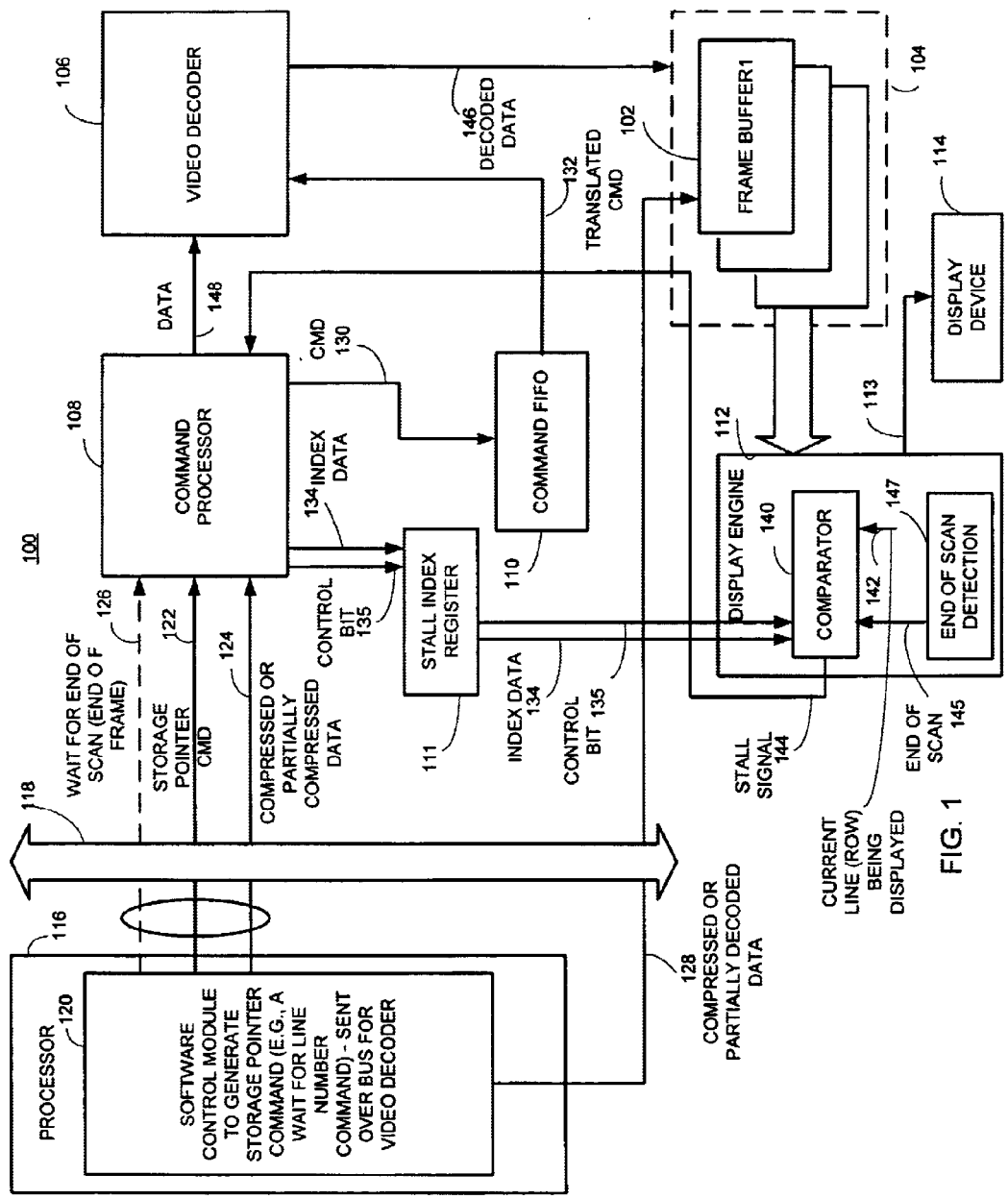
FIG. 1 is a block diagram illustrating one example of a video decoder in accordance with one embodiment of the invention.

FIG. 1 illustrates one example of a video decoding apparatus 100 for a system that uses a portion 102 of a buffer such as a frame buffer 104 to store both decoded video for display and also simultaneously store video data that requires additional decoding. The video decoding apparatus 100 includes a video decoder 106, a command processor 108, a command FIFO 110, a stall index register 111 and a display engine 112. The video decoding apparatus 100 outputs, for example, graphics and video information on a suitable display device 114 using display engine 112. The video decoding apparatus 100 will be described with reference to a compressed MPEG video stream. However, it will be recognized that any suitable video compression technique may be used. The video decoding apparatus 100 receives commands from a processor 116, such as a host processing device in a personal computer, hand held unit, or any other suitable processing device. The processor 116 communicates with the video decoding apparatus over a bus 118, such as a PCI bus, or any other suitable bus. The processor 116 executes a software control module 120 that provides a storage pointer command 122 along with compressed or partially compressed video data 124 to the command processor 108 of the video decoding apparatus 100. In addition, (and optionally), the same software control module 120 or a different software control module also generates data representing a wait for end of scan frame command 126 to the command processor 108 over bus 118. In addition, or in the alternative, the software control module 120 may provide compressed or partially compressed (partially decoded video data) 128 directly to frame buffer 104 to allow the processor 116 to perform some decoding if desired. The software control module 120 may be suitably stored in any suitable memory accessible by processor 116. The command processor 108 may be any suitable command processor that parses commands received from the software control module 120, such as the storage pointer command 122 and the wait for end of frame scan command 126 such that the command processor 108 parses the commands and sends the parsed commands 130 for storage in the command FIFO 110. The command processor 108 may suitably translate a parsed command so that it is understood by the video decoder 106. Accordingly, the command FIFO 110 is suitably controlled by the command processor 108 to output translated commands 132 for execution by the video decoder 106. The command processor receives a stall signal 144 from the display engine 112.

The video decoder 106 may be any suitable video decoder, such as an MPEG video decoder that performs, among other functions, motion compensation as known in the art. In addition, the video decoder may also perform run length decoding, inverse quantization, IDCT transformations, and any other suitable video decoding operations as desired.

The storage pointer command 122 contains index data associated with the compressed or partially compressed video data 124. The index data may represent that the command processor 108 needs to wait for a last line in a group of lines to be stored in the frame buffer before a next store occurs. The index data is parsed from the storage pointer command 122 and stored as index data 134 in the stall index register 111. The index data 134 represents a frame buffer storage location, such as a line number in the frame buffer, address within the frame buffer, or any other suitable location indication, where corresponding decoded data that is sent with the storage pointer command is finally stored before being displayed by the display engine 112. The command processor 108 translates the stored pointer command 122 to extract, for example, the line in the frame buffer where a last stored filly decoded data is put before a next store and sends this line number information in the form of index data for storage in the stall index register.

The command processor 108 may transmit a control bit 135 as a result of receiving a specific storage pointer command for enabling and disabling the stall signal as a result of. an end of frame condition in the display engine 112. In this embodiment, the display engine 112 includes a comparator 140 and an end of frame scan detection block 147. The comparator 140 is operatively coupled to the stall index register 111 to obtain the index data 134 and the control bit 135. The comparator 140 also receives a current index 142, such as a current line number or a current row of a line being displayed by the display engine and end of scan data 145 from the end of scan detection block 147. The comparator 140 compares the index data 134 with a current index 142 associated with a current display line of the display engine. When the current line being displayed is less than or equal to the line number designated by the index data 134, the comparator 140 outputs a stall signal 144 to the command processor 108. The command processor 108 stalls the command FIFO 110 by sending a stall command 130 in response to the received storage pointer command 122 for a given row of macroblocks. This affects stalling storage of at least one of the compressed data 124 or decoded data 146 for video decoder 106, into the frame buffer 102.

Accordingly, the video decoder 106 receives data to be decoded 148 from the command processor and performs the requisite decoding algorithms to provide decoded data 146 for storage in the frame buffer 102 for display by display engine 112. Since the system needs to avoid overwriting of finally stored decoded data for display until it is being displayed, the video decoding apparatus stalls storage of data that needs to be decoded until the display engine displays a requisite number of displayable lines or rows of macroblocks.

The software control module 120 generates the storage pointer command 122 so that the video decoding apparatus 100 receives the storage pointer command 122 to determine where a last row of fully decoded macroblocks in a group of macroblocks is stored in memory to avoid overwriting fully decoded data scheduled for display before it has been displayed. The processor 116 serves as a storage pointer command generator that provides, under control of software control module 120, the storage pointer command 122. The storage pointer command 122 is generated in response to determine the next row of macroblocks to be submitted for decoding.

If the current line number becomes greater than the target line number, the stall signal is removed so that the command FIFO processing will resume. Once an end of scan for a frame has been reached, all further stalls are disabled until explicitly enabled by changing the polarity of the control bit 135 sent from the control processor to the stall index register 111. The stall index register 111 contains received index data 134 and a control bit 135 obtained from the storage pointer command 122.

The command processor 108 stalls the command FIFO 110 to wait for a specified line number to be retrieved for display from the shared display memory 104 prior to executing a command for storing decoded data in the shared memory 104.

In this embodiment, the index data 134 is, for example, a vertical line address of partially decoded rows or blocks of video data, such as a row of macroblocks. In this embodiment, the comparator 140 compares a current displayed line address 142 with the vertical line address of a last line in a group of lines stored for display in the frame buffer, namely the index data 134.

To avoid prematurely releasing the storage area in the shared buffer, the video decoding apparatus 100 synchronizes storing on a frame basis. For example, the command processor 108 nay submit a command list for a next fame during a refresh period before the last scan of a previous frame and then stall execution of the decoding process, by stalling the execution of commands in the command FIFO until the end of a frame scan has been reached as indicated by the display engine 112. Accordingly, the wait for end of scan data 126 informs the command processor 108 to wait for submitting a command list for a next frame so that the command list is submitted during a refresh period before the last scan of the previous frame.

In addition, it will be recognized to one of ordinary skill in the art that the index data 134 need not be stored in a stall index register 111, but may be directly provided to the comparator 140 or suitably stored in another memory element. In addition, it will also be recognized that the comparator 140 and other functionality may be incorporated as part of the command processor 108, video decoder 106, command FIFO 110 or any other suitable hardware. In addition, it will be recognized that the comparator 140 may be implemented using software or any other suitable combination of hardware and software. Further, it will be recognized that the operation of the video decoding apparatus 100 may be incorporated in any suitable combination of hardware, software, firmware, state machines or other logic.

Figure 2:
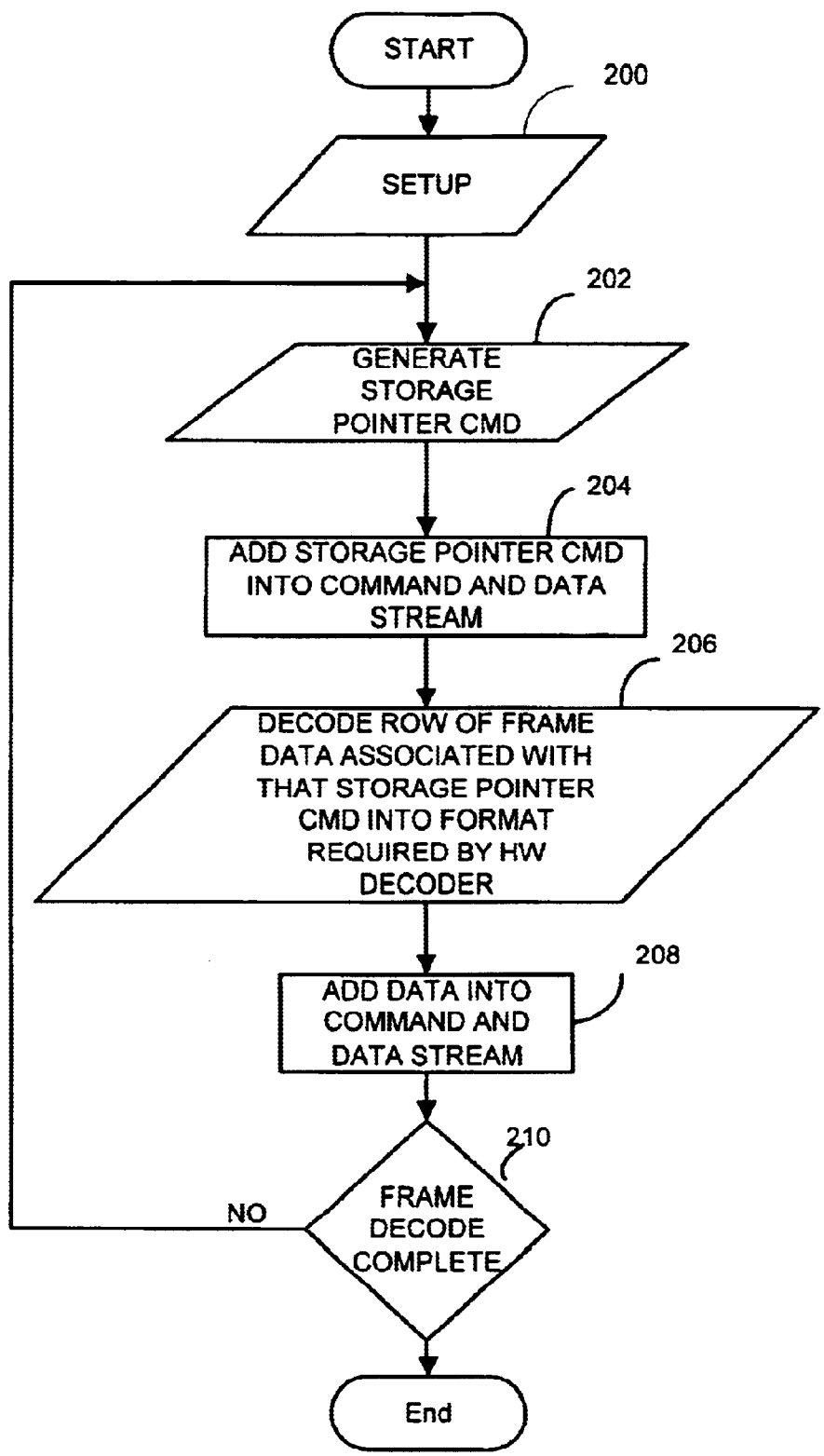
FIG. 2 is a flow chart illustrating the operation of a software control module to generate storage point commands in accordance with one embodiment of the invention.

FIG. 2 illustrates a flow chart depicting one example of the operation of the software control module 120. The process includes, as shown in block 200, send initialization commands to the display engine 112, command processor 108, video decoder 106 and other suitable circuits and processes to initialize the appropriate functionality to provide video display, such as video overlay display on display device 114. This may be accomplished in any suitable way as known in the art, including, but not limited to, a sequence of register writes for a 3D engine or any other suitable display engine. As shown in block 202, the process includes generating the storage pointer command 122 for a next row of data This is done, for example, by analyzing and determining the first macroblocks in a row of macroblocks based on <x, y> data of macroblocks in a compressed video stream. Accordingly, the software control module parses a compressed video steam to determine a first macroblock in a row of macroblocks to be displayed.

As shown in block 204, the method includes adding the storage pointer command 122 into a command and data stream for a given row of macroblocks. This is done on a per macroblock row basis. For example, the storage pointer command 122 may be interspersed with compressed data or partially compressed data so that storage pointer command 122 and compressed or partially compressed data 124 are interspersed in a command stream over bus 118 for parsing by the command processor 108. Prior to sending the storage pointer command 122 and associated compressed data, the software control module 120 may provide some level of decoding. As shown in block 206, the software control module 120 may decode a row of frame data associated with a storage pointer command 122 so that the associated compressed data that is to be stored has a line number placed in a format required by a hardware decoder For example, the software control module 120 may serve as an MPEG decoder pipeline, as known in the art, to provide, among other things, MPEG decoding having picture level, a slice level, a macro block level decoding, and also perform, for example, variable length decoding, inverse quantization and inverse DCT (IDCT) transforms. Accordingly, the video decoder 106 may perform motion compensation or other decoding functions not carried out by the software control module 120. For example, the software control module 120 may decode a stream of video to at least a slice level whereafter the hardware based video decoding apparatus 100 performs at least motion compensation.

As shown in block 208, after partial decoding, the method includes then inserting the partially decoded data into the command stream as part of the storage pointer command 122, so that the decoded data follows, for example, an associated command. As shown in block 210, the method includes determining whether an entire frame or field has been at least partially decoded. For example, the software control module may check macroblock <x, y> coordinate to see if it is a last macroblock in a picture frame.

Figure 3:
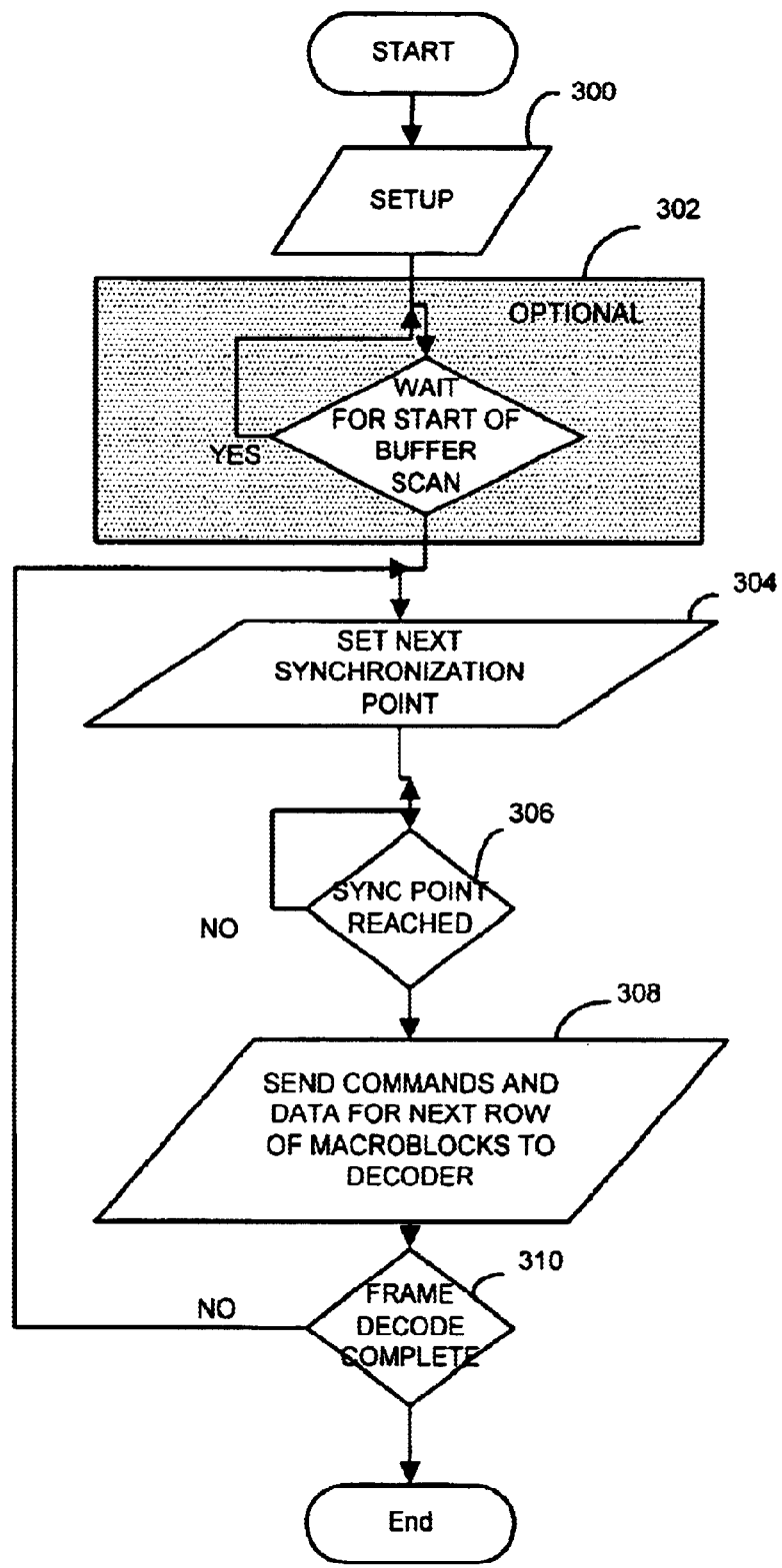
FIG. 3 is a flow chart illustrating the operation of a command processor in accordance with one embodiment of the invention.

FIG. 3 illustrates one example of the operation of the command processor 108. As shown in block 300, the command processor performs conventional set up procedures to prepare for receiving commands from processor 116. If desired, the command processor can wait until it receives a start of a frame buffer scan command, as shown in block 302. The process includes setting a next synchronization point, as shown in block 304. This includes, for example, extracting from the data and the command stream, the storage pointer command 122 and storing the index data 134 from the storage pointer command 122, such as a line number, in the stall index register 111. This index data 134 may be, for example, as noted above, a memory address corresponding to a last line of a group of lines to be displayed. For example, if the current display line is greater than the index data 134 or target line, the process continues to block 308. As shown in block 308, if the current display line, for example, is greater than the target line, the process includes sending additional commands and partially decoded data for a next row to the video. decoder 106. Accordingly, additional rows of partially decoded video are finally decoded by the video decoder and suitably stored in the frame buffer. This is performed as other fully decoded lines are being displayed from the same frame buffer. As shown in block 310, if the full frame has been decoded, the command process then waits for another frame for decoding. However, if the frame has not been completely decoded, the process includes setting the next synchronization point, namely the line number address of the row being decoded, to compare it with the current display line.

Figure 4:
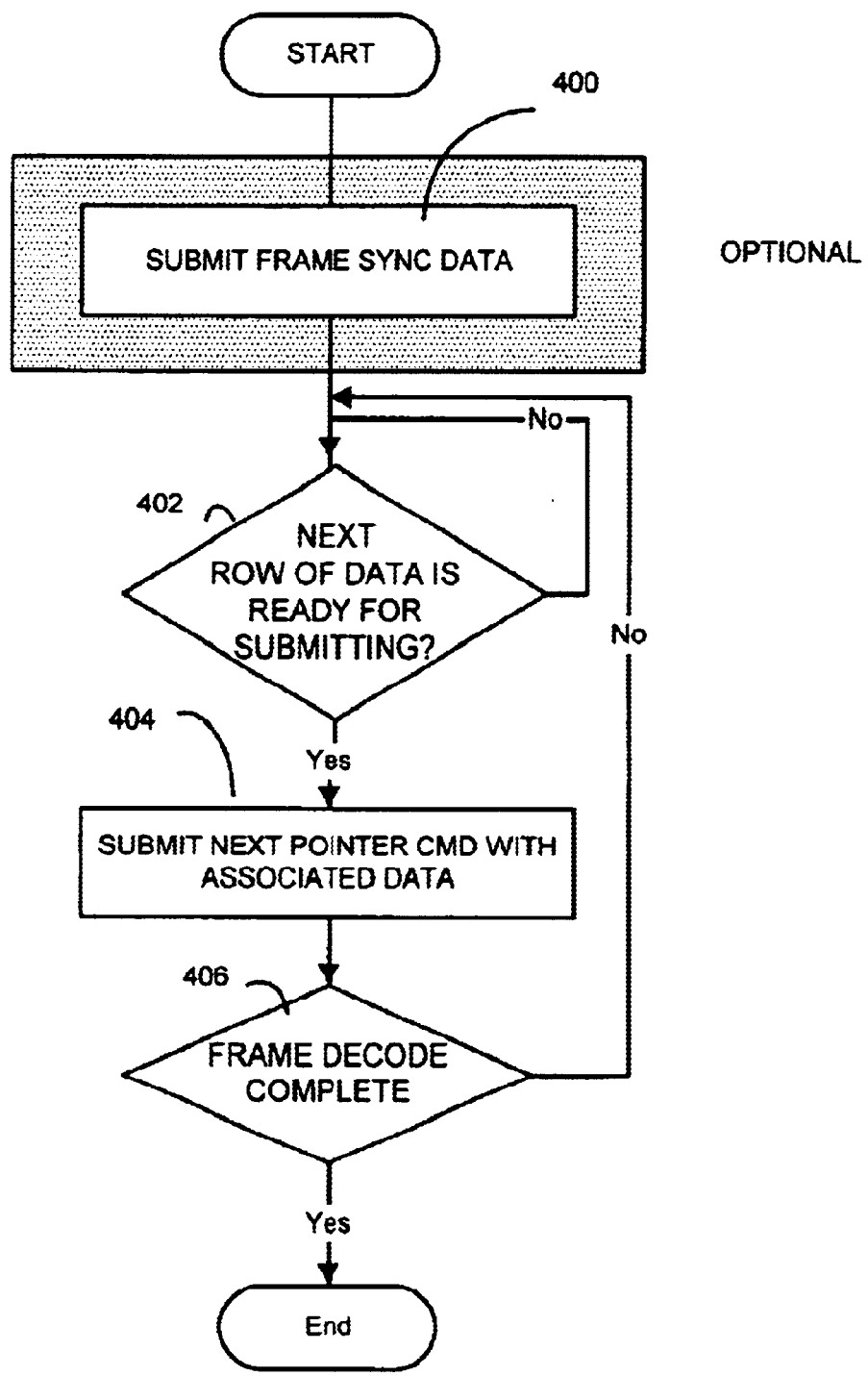
FIG. 4 is a flow chart illustrating one example of a method for decoding compressed video in accordance with one embodiment of the invention.

FIG. 4 illustrates one example of the process for submitting the storage pointer command 122 and other commands across bus 118 as carried out by the software control module 120. As shown in block 400, the software control module 120 may submit frame synchronization data to allow frame synchronization with the command processor 108. As shown in block 402, the software control module 120 determines whether the next row of data is ready for submitting for decoding. If the next row is ready, the process includes submitting the next storage pointer command 122 and associated data to the command processor 108 shown in block 404. The software control module 120 then determines if a complete frame has been sent for decoding, as shown in block 406. If not, the software control module 120 continues sending, the partially or fully compressed data along with the corresponding storage pointer command 122 indicating the corresponding last line number address of the compressed or partially compressed data being sent for decoding. The process continues until a complete frame has been sent for decoding.

Figure 5A:
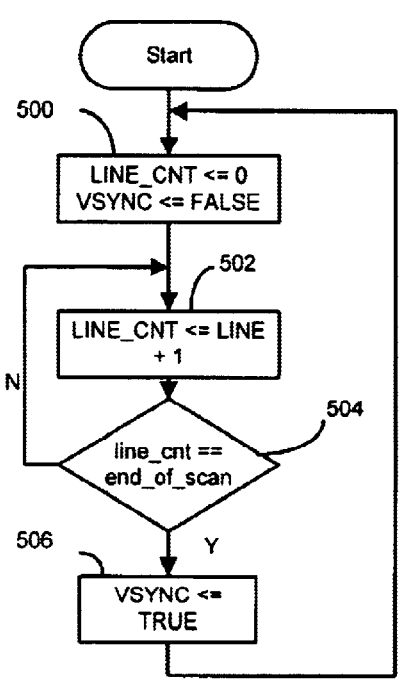
FIGS. 5a and 5b are flowcharts illustrating a display and stalling process in accordance with one embodiment of the invention.

Referring to FIG. 5a, the display engine 112 keeps track, as known in the art, of when the end of a scan frame has occurred. This will indicate, for example, when an entire frame buffer has been displayed. For example, as shown in block 500, the display engine 112 may set a line count register equal to zero and a vertical sync bit to a "false" level indicating that a vertical sync has not been detected. As shown in block 502, the line count register is then incremented to indicate the current line being displayed. This information is then sent to the comparator 140. As shown in block 504, the comparator 140 determines if the current line count equals the same line number indicating an end of the scan of an entire field or frame. If they are equal, the vertical sync bit is set to equal. "true," indicating that an end of a scan of an entire field or frame has occurred. If they are not equal, the process increments the line number as shown in block 502.

Figure 5B:
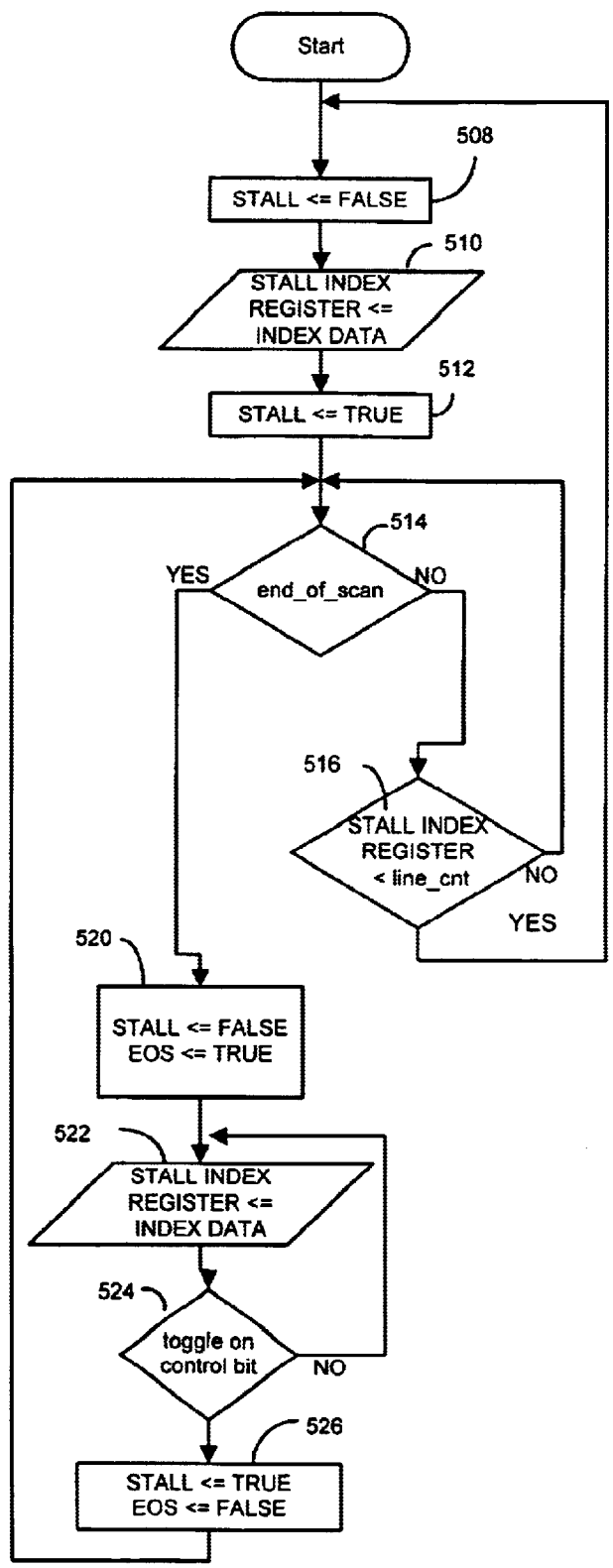

FIG. 5b describes a separate process for each displayed frame buffer. As shown in block 508, the stall signal is set to a "false" level, such as a logic zero, indicating that the stall should not be initiated. The process continues in block 510, wherein the stall index register 111 is assigned a new value of index data 134, including the control bit 135, and the stall signal is set to true, as shown in block 512.

For example, if the end of a frame scan has not occurred as indicated by end of scan data 145 (FIG. 1), shown in block 514, the stall index register 111 (which contains index data 134) is compared to the current line being displayed 142, shown in block 516. If its value is less than the current line, the stall signal is set to false when the process starts again at block 508. However, if its value is greater than or equal to the current line number the process continues at block 514, keeping the stall signal set to "true".

However, if the end of a frame scan has occurred as indicated by the end of scan data 145, the stall signal is set to "false" and an end of scan (EOS_PASS) line pass bit 141 is set equal to true, as shown in block 520. As shown in block 522, the method includes waiting for a new value of index data 134 to be assigned to the stall index register. If, as a result of the new assignment, the logical value of the control bit 135 changes its polarity, as determined by block 524, the process continues with block 526, setting the stall signal to "true" and the end of scan passed bit to "false". However, if the control bit 135 does not change its polarity, the process will loop back to block 522 waiting for a new assignment to the stall index register.

The stalling of the command flow at the output of the command FIFO prevents the command processor 108 from fetching from the command queue until a release point or condition has been reached. This allows the processor 116 to continue decoding into the command queue without interruption.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A video decoding apparatus for a system that uses a portion of a buffer to store decoded video being displayed and simultaneously uses another portion of the same buffer for decoding, comprising:
    a command processor, operatively coupled to receive compressed video data to be stored in the buffer, and operatively coupled to receive, over a bus, a storage pointer command for a video decoder wherein the storage pointer command contains index data associated with the compressed video data, and wherein the index data represents a buffer storage location where corresponding decoded data is finally stored for displaying;
    a command FIFO operatively coupled to the command processor; and
    a comparator, operatively coupled to compare the index data with a current index associated with a current display line of a display engine;
    such that the command processor stalls the command FIFO in response to the received storage pointer command to effect stalling of storage of at least one of the compressed data and the corresponding decoded data into the buffer, based on the comparison.

2. The apparatus of claim 1 including a register operatively coupled to the command processor that contains received index data from the storage pointer command.

3. The apparatus of claim 2 wherein the index data represents vertical line address data on a per macroblock row basis of a row of blocks of video data; and wherein the comparator is operatively coupled to the register, and compares a current displayed line address with the vertical line address data.

4. The apparatus of claim 1 wherein the command processor stalls the command FIFO to wait for a specified line number to be retrieved for display from the shared display memory and decoding memory prior to executing a command for storing partially or fully decoded data in the shared memory.

5. The apparatus of claim 1 wherein the compressed video data compressed is in an MPEG format.

6. The apparatus of claim 1 including a storage pointer command generator operatively coupled to the bus, that provides the storage pointer command for the command processor in response to determining a next row of blocks of data to be submitted for decoding.

7. The apparatus of claim 1 wherein the command processor translates the storage pointer command to extract a last stored fully decoded data.

8. The apparatus of claim 1 wherein the storage pointer command is interspersed with the compressed video data.

9. A video decoding method for use in a system that uses a portion of a buffer to store decoded video for display and simultaneously uses another portion of the same buffer to store video data that requires additional decoding, comprising the steps of:
    providing, over a bus, video data to be stored in the buffer and later decoded;
    providing, over the bus, a storage pointer command for a video decoder wherein the storage pointer command contains index data associated with the compressed video data, and wherein the index data represents a buffer storage location where corresponding decoded data is finally stored before display;
    storing the index data;
    comparing the index data with a current index associated with a current display line of the display engine;
    stalling decoding of at least one of the compressed data and the corresponding decoded data into the buffer, based on the comparison.

10. The method of claim 9 including the step of stalling output of commands from a command FIFO to wait for a specified line number to be retrieved for display from the shared display memory and decoding memory prior to executing a command for further decoding in the shared memory.

11. The method of claim 10 wherein the index data represents vertical line address data of a decoded row of blocks of video data; and wherein the step of comparing includes comparing a current displayed line address with the vertical line address data to determine whether to stall storage of at least one of compressed video data, uncompressed data, and the corresponding decoded data into the buffer.

12. The method of claim 9 wherein the video data is compressed in an MPEG format.

13. The method of claim 9 including the step of generating the storage pointer command and communicating the storage pointer command over a bus for a command processor in response to determining a next row of blocks of data to be submitted for decoding.

14. The method of claim 9 including the step of:
disabling the stalling of storage of at least one of compressed video data, and the corresponding decoded data into the buffer in response to an end of frame scan.

15. The method of claim 9 including the step of synchronizing the stalling of storage of compressed video data and the corresponding decoded data into the buffer by submitting the storage pointer command for a next frame during a screen refresh condition before a last scan of a previous frame, to stall storage until an end of a frame scan.

16. The method of claim 9 including the step of translating the storage pointer command to extract a last stored fully decoded data.

17. The method of claim 9 including the step of interspersing the storage pointer command with the compressed video data.

* * * * *